United States Patent
Lee et al.

(10) Patent No.: US 10,681,736 B2
(45) Date of Patent: Jun. 9, 2020

(54) METHOD FOR ALLOWING TERMINAL TO PERFORM RANDOM ACCESS STEP IN WIRELESS COMMUNICATION SYSTEM AND DEVICE THEREFOR

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 474 days.

(21) Appl. No.: 14/351,495

(22) PCT Filed: Oct. 26, 2012

(86) PCT No.: PCT/KR2012/008864
§ 371 (c)(1),
(2) Date: Apr. 11, 2014

(87) PCT Pub. No.: WO2013/062357
PCT Pub. Date: May 2, 2013

(65) Prior Publication Data
US 2014/0301330 A1  Oct. 9, 2014

Related U.S. Application Data
(60) Provisional application No. 61/552,436, filed on Oct. 27, 2011.

(51) Int. Cl.
*H04W 74/08* (2009.01)
*H04L 5/00* (2006.01)

(52) U.S. Cl.
CPC ....... *H04W 74/0833* (2013.01); *H04L 5/0023* (2013.01); *H04L 5/0048* (2013.01); *H04L 5/0053* (2013.01)

(58) Field of Classification Search
CPC ....................................................... H04W 74/08
(Continued)

(56) References Cited

U.S. PATENT DOCUMENTS

| | | | |
|---|---|---|---|
| 2006/0172707 A1* | 8/2006 | Stern-Berkowitz | H04W 16/18 455/67.11 |
| 2009/0088148 A1* | 4/2009 | Chung | H04L 5/0007 455/423 |

(Continued)

FOREIGN PATENT DOCUMENTS

| | | |
|---|---|---|
| CA | 2664586 A1 | 5/2008 |
| CN | 101946423 A | 1/2011 |

(Continued)

OTHER PUBLICATIONS

LG Electronics, "Consideration on common search space configuration for rel-11 UEs," 3GPP TSG RAN WG1 Meeting #66b, R1-113196, Zhuhai, China, Oct. 10-14, 2011, 5 pages.

(Continued)

*Primary Examiner* — Kodzovi Acolatse
*Assistant Examiner* — Abdeltif Ajid
(74) *Attorney, Agent, or Firm* — Birch, Stewart, Kolasch & Birch, LLP

(57) ABSTRACT

The present invention relates to a method for allowing a terminal to perform a random access procedure in a wireless communication system and a device therefor. Specifically, the method for allowing a terminal to perform a random access procedure in a wireless communication system comprises the steps of: setting a first search space for a first downlink control channel and/or a second search space for a second downlink control channel according to control channel configuration information of a terminal; and detecting a downlink data channel by blind decoding the first search space and/or the second search space, wherein the
(Continued)

first downlink control channel and the second downlink control channel are detected by using different indicators.

8 Claims, 14 Drawing Sheets

(58) Field of Classification Search
USPC .................................................. 370/329
See application file for complete search history.

(56) References Cited

U.S. PATENT DOCUMENTS

| | | | |
|---|---|---|---|
| 2009/0186613 A1* | 7/2009 | Ahn | H04W 72/042 |
| | | | 455/434 |
| 2009/0197631 A1* | 8/2009 | Palanki | H04W 72/0413 |
| | | | 455/522 |
| 2010/0015967 A1* | 1/2010 | Perets | H04W 4/00 |
| | | | 455/422.1 |
| 2010/0111028 A1 | 5/2010 | Kim et al. | |
| 2010/0220618 A1 | 9/2010 | Kwon et al. | |
| 2010/0302998 A1 | 12/2010 | Bao et al. | |
| 2011/0250913 A1* | 10/2011 | Vajapeyam | H04W 74/0833 |
| | | | 455/507 |
| 2012/0302240 A1* | 11/2012 | Tamaki | H04W 36/0011 |
| | | | 455/436 |
| 2013/0010711 A1* | 1/2013 | Larsson | H04W 56/0005 |
| | | | 370/329 |
| 2014/0112254 A1* | 4/2014 | Lindoff | H04W 74/002 |
| | | | 370/328 |
| 2014/0219224 A1 | 8/2014 | Lee et al. | |
| 2015/0296542 A1* | 10/2015 | Heo | H04W 74/0833 |
| | | | 370/329 |

FOREIGN PATENT DOCUMENTS

| | | |
|---|---|---|
| KR | 10-2008-0039176 A | 5/2008 |
| KR | 10-2008-0110554 A | 12/2008 |
| KR | 10-2009-0031177 A | 3/2009 |
| KR | 10-2009-0062741 A | 6/2009 |
| KR | 10-2010-0094539 A | 8/2010 |

OTHER PUBLICATIONS

Texas Instruments, "Support of Multiple Timing Advances," 3GPP TSG RAN WG1 #66bis, R1-113483, Zhuhai, China, Oct. 10-14, 2011, pp. 1-4.

Potevio, "Consideration on RACH Based Multiple TA Acquire," 3GPP TSG-RAN WG2 Meeting #75, R2-114144, Athens, Greece, Aug. 22-26, 2011, pp. 1-5.

Rapporteur (Samsung) et al. "Introduction of Carrier Aggregation," Change Request, 3GPP TSG-RAN WG2 Meeting #71, R2-104991, Madrid, Spain, Aug. 23-27, 2010, 82 pages.

* cited by examiner

FIG. 2
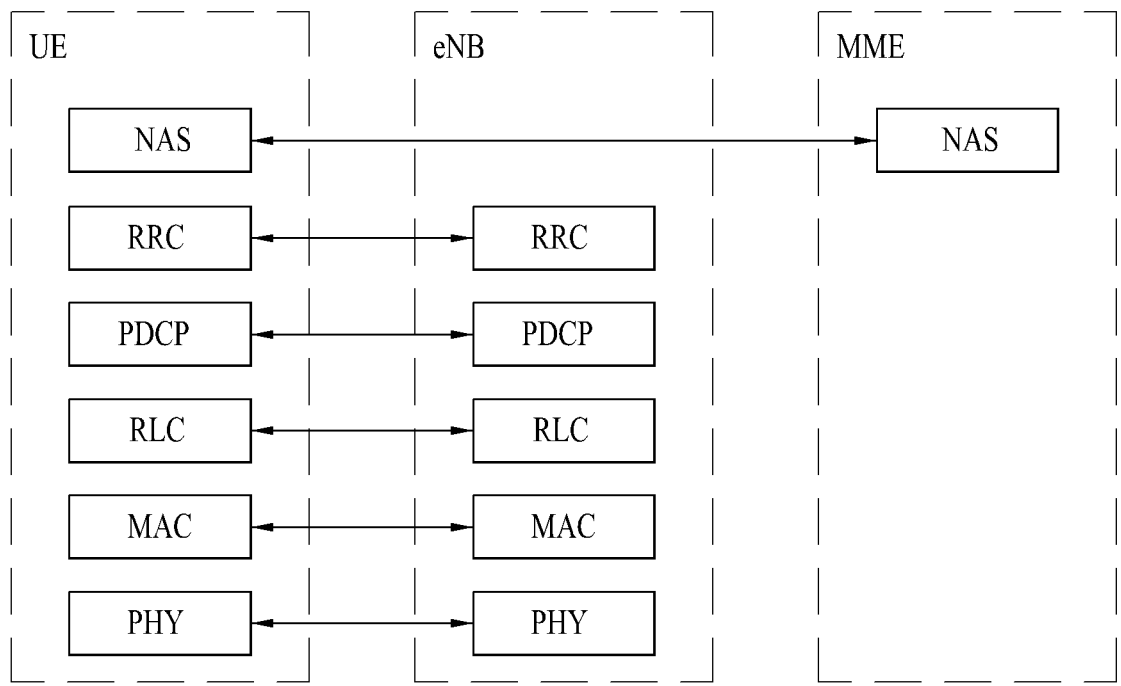
(a) Control-plane protocol stack
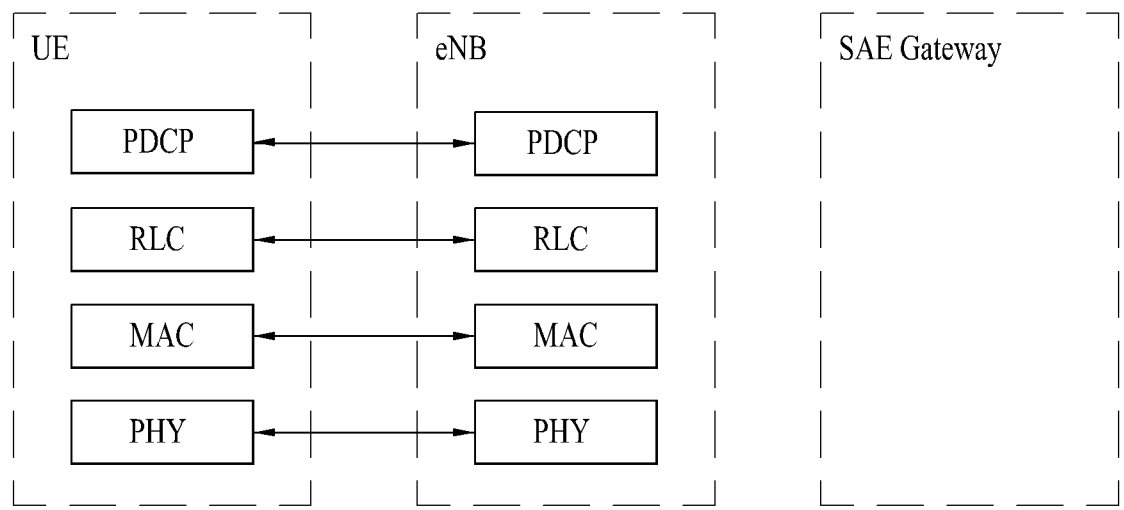
(b) User-plane protocol stack

FIG. 8
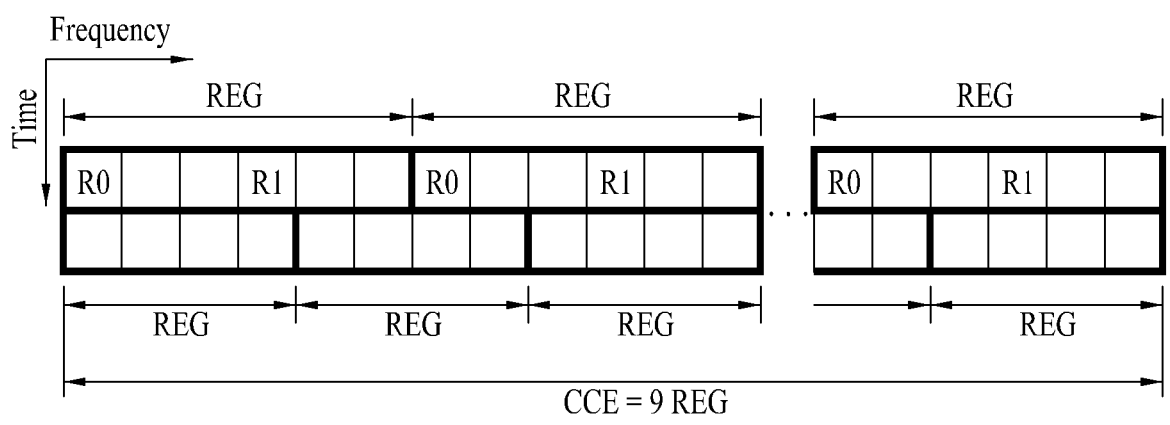
(a) 1TX or 2TX
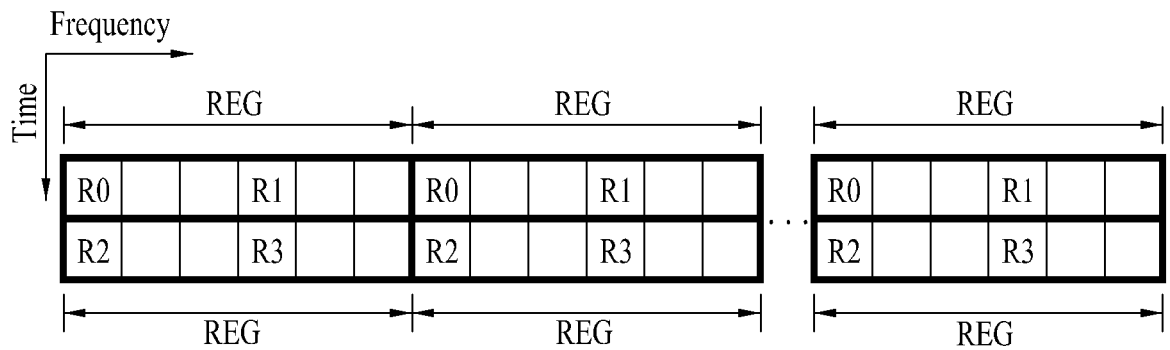
(b) 4 TX

METHOD FOR ALLOWING TERMINAL TO PERFORM RANDOM ACCESS STEP IN WIRELESS COMMUNICATION SYSTEM AND DEVICE THEREFOR

CROSS REFERENCE TO RELATED APPLICATIONS

This non-provisional application is a National Stage entry under U.S.C. § 371 of International Application No. PCT/KR2012/008864 filed on Oct. 26, 2012, which claims the benefit of U.S. Provisional Application No. 61/552,436 filed on Oct. 27, 2011. The entire contents of all of the above applications are hereby incorporated by reference.

TECHNICAL FIELD

The present invention relates to a wireless communication system, and more particularly, to a method and apparatus for performing a random access procedure at a terminal in a wireless communication system.

BACKGROUND ART

A brief description will be given of a $3^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to "$3^{rd}$ Generation Partnership Project; Technical Specification Group Radio Access Network" Release 7 and Release 8, respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectations of users and service providers are increasing. Considering that other radio access technologies are under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the conventional problem is to provide a method and apparatus for receiving a downlink control channel at a terminal in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing a random access procedure at a User Equipment (UE) in a wireless access system includes transmitting a Random Access (RA) preamble message, setting at least one of a first search space for a first downlink control channel and a second search space for a second downlink control channel as a search space for a Random Access Response (RAR) message, and receiving the RAR message by blind-decoding the search space for the RAR message.

In another aspect of the present invention, a UE for performing a random access procedure in a wireless access system includes a Radio Frequency (RF) unit and a processor. The processor transmits an RA preamble message, sets at least one of a first search space for a first downlink control channel and a second search space for a second downlink control channel as a search space for an RAR message, and receives the RAR message by blind-decoding the search space for the RAR message.

The first search space and the second search space may be used for different frequency groups. The search space for the RAR message may be indicated by a system information transmission channel including a Physical Random Access Channel (PRACH) frequency offset.

The first search space and the second search space may be distinguished by different time unit information. The search space for the RAR message may be identified by an indicator indicating a specific radio frame or a specific subframe.

The first search space and the second search space may be distinguished by different preamble formats or different preamble sequence indexes.

The search space for the RAR message may be set to be a search space having a smaller amount of interference between the first search space and the second search space.

The reception of the RAR message may include receiving the RAR message from a base station according to a downlink control channel transmitted in a search space having a smaller amount of interference between the first search space and the second search space.

The method may further include receiving a message for the random access procedure based on the search space for the RAR message.

The method may further include allocating an RA preamble, and the search space for the RAR message may be a search space in which the RA preamble is received.

The method may further include receiving a message for the random access procedure based on a search space other than the search space for the RAR message.

The method may further include allocating an RA preamble, and the search space for the RAR message may be different from a search space in which the RA preamble is received.

The first downlink control channel and the second downlink control channel for the random access procedure may be transmitted in different radio resources.

Advantageous Effects

According to the present invention, since a User Equipment (UE) detects control information for use in receiving a random access response message by blind-decoding a plurality of search spaces, interference from a neighbor cell can be mitigated.

According to the present invention, a limited capacity of a control channel can be overcome by use of an additional control channel based on an additional indicator.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 illustrates a control-plane protocol stack and a user-plane protocol stack in a radio interface protocol architecture conforming to a $3^{rd}$ Generation Partnership Project (3GPP) radio access network standard between a User Equipment (UE) and an Evolved UMTS Terrestrial Radio Access Network (E-UTRAN);

FIG. 8 illustrates Resource Elements (REs) used to configure a downlink control channel in the LTE system;

BEST MODE

Figure 1:
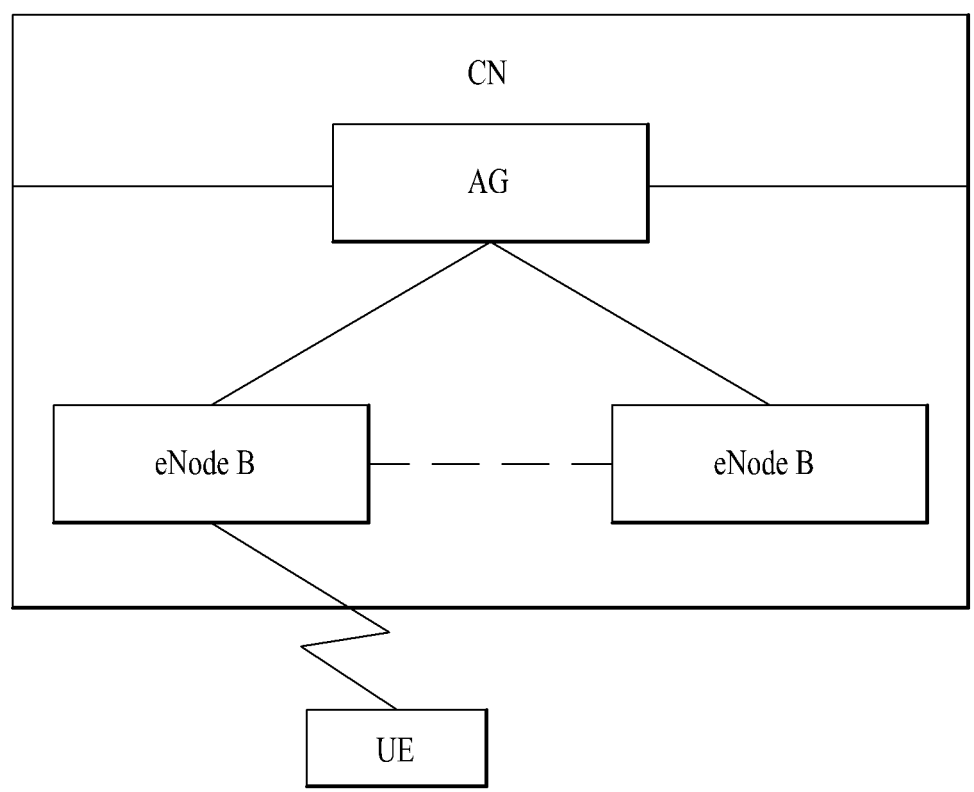
FIG. 1 illustrates a configuration of an Evolved Universal Mobile Telecommunications System (E-UMTS) network as an example of a wireless communication system.

Techniques as set forth below are applicable to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as Institute of Electrical and Electronics Engineers (IEEE) 802.11 (Wi-Fi), IEEE 802.16 (WiMAX), IEEE 802.20, Evolved-UTRA (E-UTRA) etc. UTRA is a part of Universal Mobile Telecommunication System (UMTS). $3^{rd}$ Generation Partnership Project (3GPP) Long Term Evolution (LTE) is a part of Evolved UMTS (E-UMTS) using E-UTRA. The 3GPP LTE employs OFDMA for downlink and SC-FDMA for uplink. LTE-Advanced (LTE-A) is an evolution of the 3GPP LTE.

While embodiments of the present invention are described in the context of a 3GPP LTE/LTE-A system, they are purely exemplary. Therefore, the embodiments of the present invention are applicable to any other communication system as long as the above definitions are valid for the communication system. Specific terms used for the embodiments of the present invention are provided to help the understanding of the present invention. These specific terms may be replaced with other terms within the scope and spirit of the present invention.

In a wireless communication system, a User Equipment (UE) receives information from an evolved Node B (eNode B or eNB) on a Downlink (DL) and transmit information to the eNB on an Uplink (UL). Information transmitted and received between the eNB and the UE includes data and various types of control information and various physical channels exist depending on the types/usages of the transmitted and received information.

FIG. 2 illustrates control-plane and user-plane protocol stacks in a radio interface protocol architecture conforming to a 3GPP wireless access network standard between a UE and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in OFDMA for DL and in SC-FDMA for UL.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell managed by an eNB is set to one of bandwidths of 1.4, 3, 5, 10, 15, and 20 Mhz and provides a DL or UL service to a plurality of UEs. Different cells may be set to different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
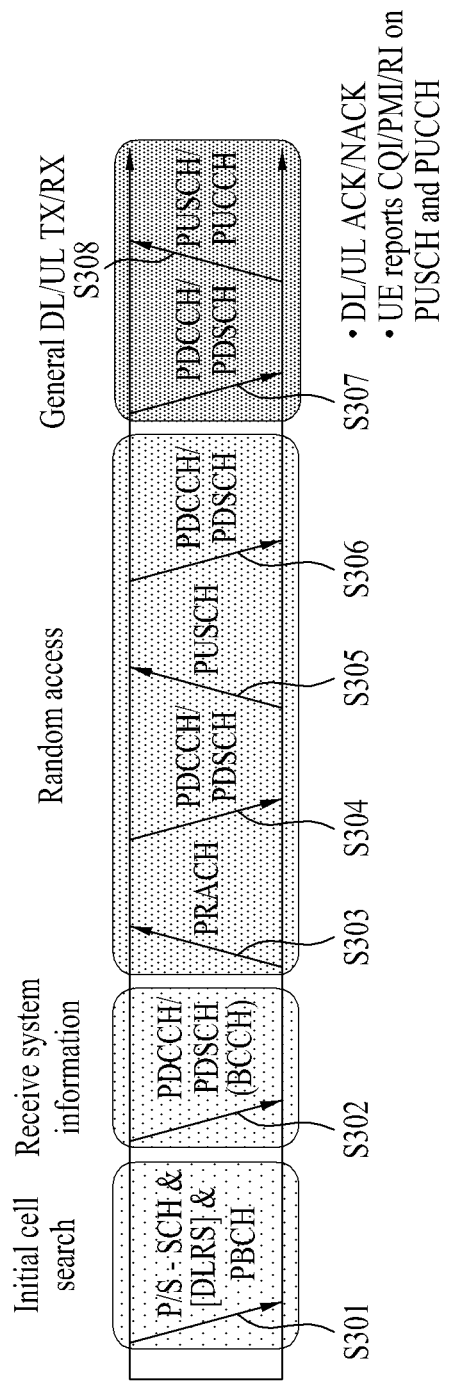
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search in step S301. The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH in step S302.

Subsequently, the UE may perform a random access procedure with the eNB in steps S303 to S306 to complete a connection to the eNB. In the random access procedure, the UE may transmit a preamble on a Physical Random Access Channel (PRACH) (S303) and may receive a response message to the preamble on a PDCCH and a PDSCH associated with the PDCCH (S304). In the case of contention-based random access, the UE may additionally perform a contention resolution procedure including transmission of an additional PRACH (S305) and reception of a PDCCH and a PDSCH associated with the PDCCH (S306).

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Control information that the UE transmits to the eNB on the UL is referred to as Uplink Control Information (UCI). The UCI includes a Hybrid Automatic Repeat and Request ACKnowledgment/Negative ACKnowledgment (HARQ ACK/NACK) signal, a Scheduling Request (SR), Channel State Information (CSI), etc. In the specification, an HARQ ACK/NACK is shortly called an HARQ-ACK or an ACK/NACK (A/N). The HARQ-ACK includes at least one of positive ACK (shortly, ACK), negative ACK (shortly, NACK), Discontinuous Transmission (DTX), and NACK/DTX. The CSI includes a Channel Quality Indicator (CQI), a Precoding Matrix Index (PMI), a Rank Indicator (RI), etc. While the UCI is transmitted generally on a PUCCH, it may be transmitted on a PUSCH in the case where control information and traffic data are to be transmitted simultaneously. Further, the UE may transmit the UCI aperiodically on the PUSCH, upon receipt of a request or command from the network.

Figure 4:
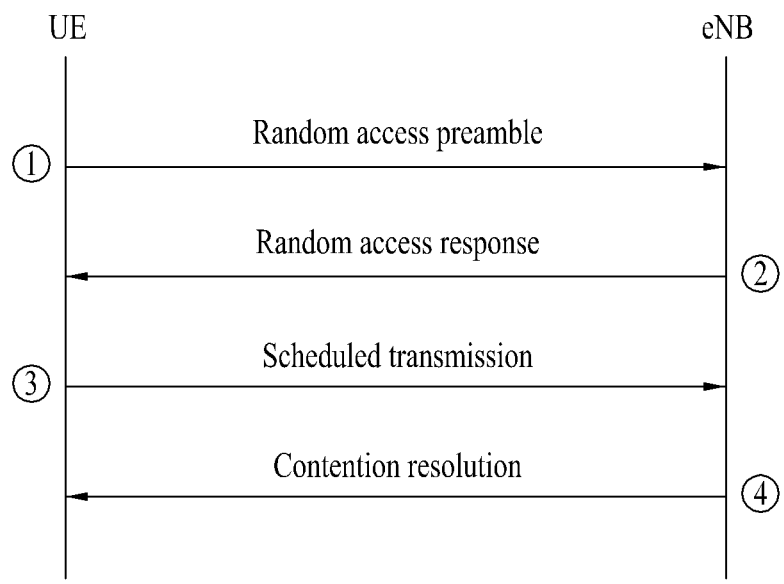
FIG. 4 illustrates a contention-based random access procedure as a random access procedure used in the 3GPP system.

FIG. 4 illustrates an operation between a UE and an eNB in a contention-based random access procedure.

In the contention-based random access procedure, the UE may randomly select a random access preamble from a group of random access preambles indicated by system information or a handover command, may select PRACH resources on which to transmit the random access preamble, and may transmit the selected random access preamble to the eNB (step 1).

After transmitting the random access preamble, the UE may attempt to receive a response to the random access preamble within a random access preamble reception window indicated by the system information or the handover command (step 2). Specifically, random access information may be transmitted in a MAC PDU and the MAC PDU may be transmitted on a PDSCH. In addition, a PDCCH is transmitted so that the UE may receive information on the PDSCH appropriately. That is, the PDCCH delivers information about a UE to receive the PDSCH, time and frequency information about radio resources of the PDSCH, and information about a transport format of the PDSCH. Upon successful receipt of the PDCCH, the UE may receive a random access response on the PDSCH based on information of the PDCCH. The random access response may include an ID of a random access preamble, a UL Grant, a Temporary Cell Radio Network Temporary Identifier (C-RNTI), a Time Alignment Command (TAC), etc. The reason for including the ID of the random access preamble in the random access response is to indicate information to which the UL Grant, the Temporary C-RNTI, and the TAC are valid to the UE. The ID of the random access preamble is required because one random access preamble may include random access information for one or more UEs. The ID of the random access preamble may be identical to the ID of the random access preamble selected by the UE in step 1.

Upon receipt of the valid random access response, the UE may process the information included in the random access response. That is, the UE stores the Temporary C-RNTI. Further, the UE uses the UL Grant to transmit data stored in a buffer or new data to the eNB (step 3). Herein, an ID of the UE should be included in the data carried by the UL Grant. This is because the eNB cannot identify UEs performing the random access procedure and should identify the UEs later for contention procedure in the contention-based random access procedure. A UE ID may be included in a UL Grant in two methods. One of the methods is to transmit the cell ID of the UE in the UL grant in relation to whether the UE has already received the valid cell ID assigned to the cell of the UE before the random access procedure. The other method is to transmit a unique ID of the UE, if the UE has not received the valid cell ID before the random access procedure. In general, the unique ID of the UE is longer than the cell ID. If the UE transmits the data in the UL Grant in step 3, the UE starts a contention resolution timer.

After transmitting the data along with the ID in the UL grant included in the random access response, the UE awaits receipt of an indication for contention resolution from the eNB. That is, the UE attempts to receive a PDCCH in order to receive a specific message (step 4). The PDCCH may be received in two methods. As described before, if the UE ID transmitted in the UL Grant is the cell ID, the UE attempts to receive a PDCCH using the cell ID. If the UE ID transmitted in the UL Grant is the unique ID of the UE, the UE attempts to receive a PDCCH using the Temporary C-RNTI included in the random access preamble. In the former case, upon receipt of a PDCCH using the cell ID before expiration of the contention resolution timer, the UE completes the random access procedure, determining that the random access procedure is successful. In the latter case, upon receipt of a PDCCH using the Temporary C-RNTI before expiration of the contention resolution timer, the UE checks data received on a PDSCH indicated by the PDCCH. If the unique ID of the UE is included in the data, the UE completes the random access procedure, determining that the random access procedure is successful.

Figure 5:
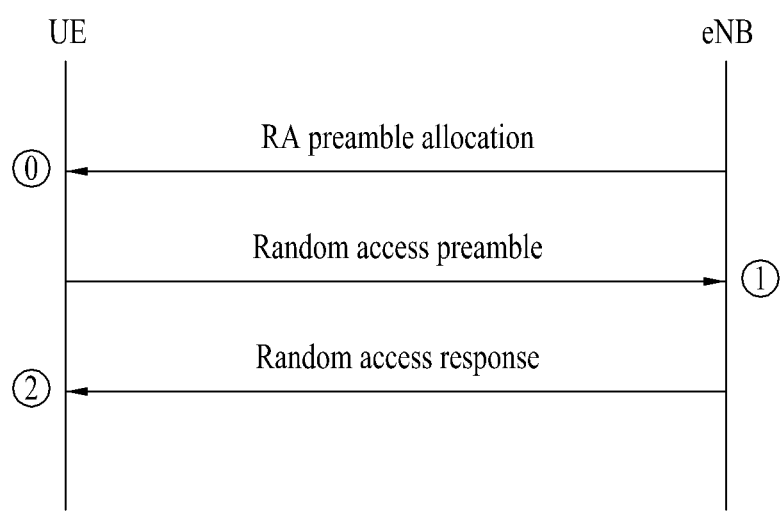
FIG. 5 illustrates a contention-free random access procedure as a random access procedure used in the 3GPP system.

FIG. 5 illustrates an operation between an eNB and a UE in a contention-free random access procedure. Compared to the contention-based random access procedure, upon receipt of random access response information in response to a random access preamble, the UE completes the random access procedure, considering that the random access is successful in the contention-free random access procedure.

In general, the contention-free random access procedure is performed in two cases: handover and upon request of an eNB. The contention-based random access procedure may also be performed in these two cases. It is important for the UE to receive a dedicated random access preamble from the eNB without contention. A handover command and a PDCCH command may be generated to allocate the random access preamble. When the eNB allocates the dedicated random access preamble to the UE, the UE transmits the preamble to the eNB. Subsequently, random access response information is received in the same manner as in the contention-based random access procedure.

When the eNB commands the UE to start the contention-free random access procedure, the contention-free random access procedure is initiated. In this case, the eNB selects a specific preamble for use in the random access procedure and directly indicates the specific preamble to the UE. For example, if the eNB notifies the UE of 4 as the ID of the random access preamble (i.e., RAPID=4), the UE may perform the contention-free random access procedure using a specific preamble corresponding to RAPID=4.

Now a description will be given of a Multiple Input Multiple Output (MIMO) system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term 'MIMO' is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 6:
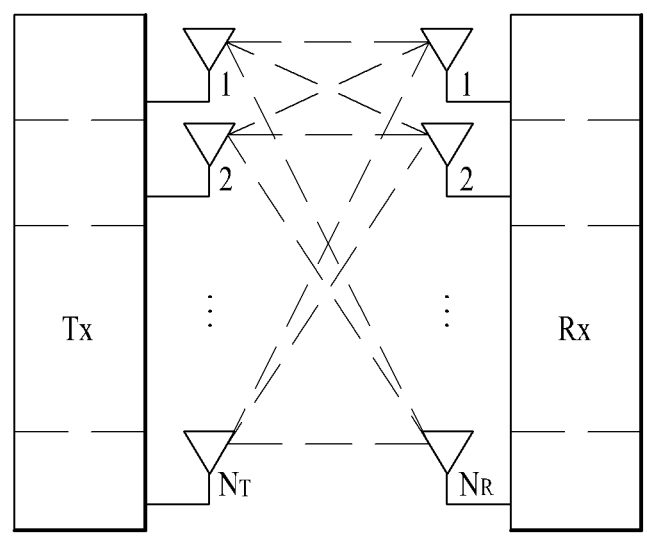
FIG. 6 illustrates a configuration of a Multiple Input Multiple Output (MIMO) communication system.

FIG. 6 illustrates the configuration of a MIMO communication system. Referring to FIG. 6, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

To describe a communication method in the MIMO system, the MIMO system may be modeled mathematically as follows. As illustrated in FIG. 6, it is assumed that there are $N_T$ Tx antennas and $N_R$ Rx antennas. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, s_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$
$$= WPs$$

[Equation 5]

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

Figure 7:
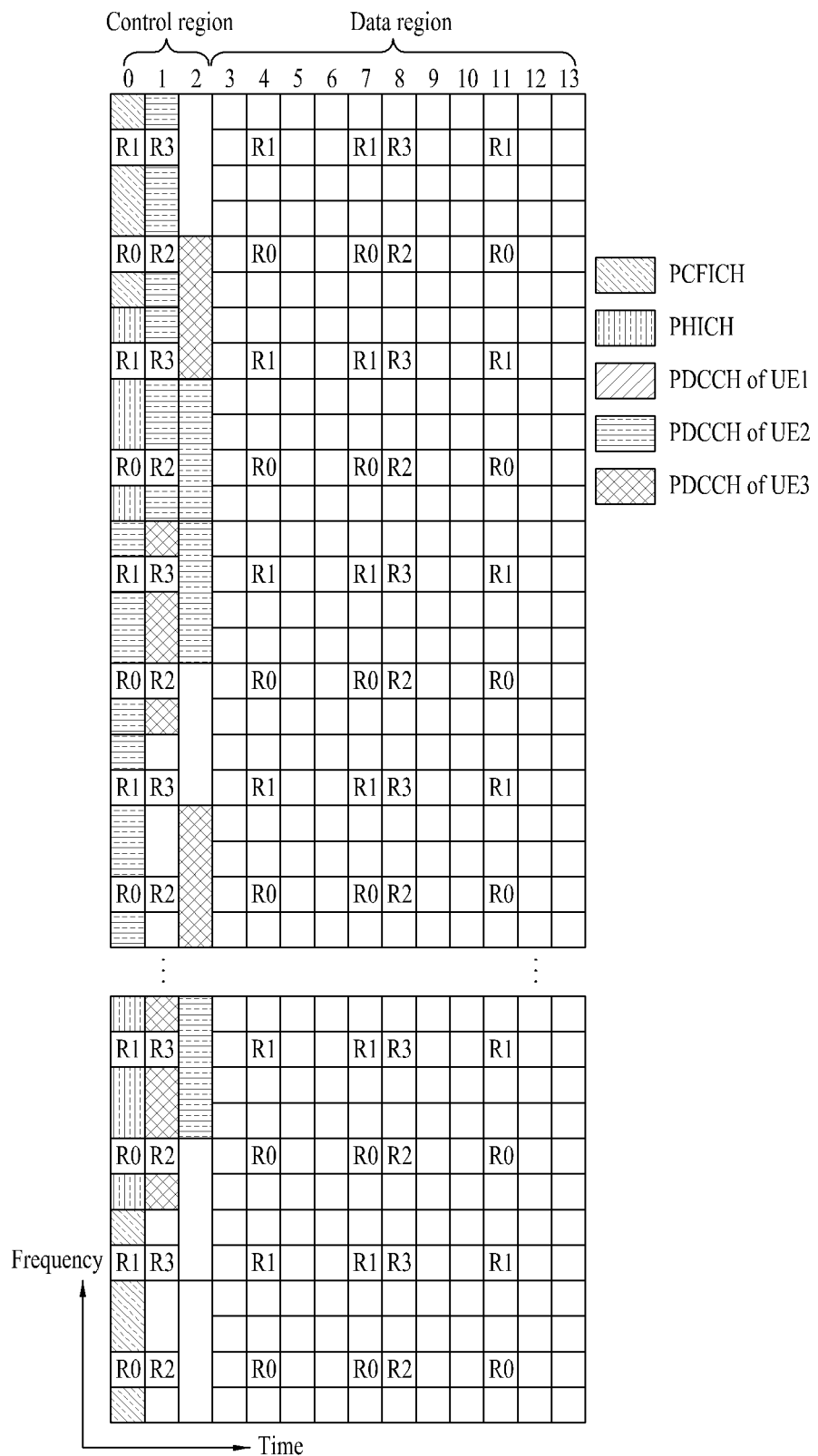
FIG. 7 illustrates a structure of a downlink radio frame in a Long Term Evolution (LTE) system.

FIG. 7 illustrates exemplary control channels included in a control region of a subframe in a DL radio frame.

Referring to FIG. 7, a subframe includes 14 OFDM symbols. The first one to three OFDM symbols of a subframe are used for a control region and the other 13 to 11 OFDM symbols are used for a data region according to a subframe configuration. In FIG. 7, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell ID. One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical HARQ indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more Control Channel Elements (CCEs). The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 8 illustrates REs used for configuring a DL control channel in the LTE system. Specifically, FIG. 6(a) illustrates REs of a DL control channel in the case of 1 or 2 Tx antennas in an eNB and FIG. 6(b) illustrates REs of a DL control channel in the case of 4 Tx antennas in an eNB. Although a different RS pattern is used according to the number of Tx antennas, REs are configured for a DL control channel in the same manner.

Referring to FIG. 8, a basic resource unit of a DL control channel is an REG. The REG includes four contiguous REs except for REs carrying RSs. REGs are marked with bold lines in FIG. 8. A PCFICH and a PHICH include 4 REGs and 3 REGs, respectively. A PDCCH is configured in units of a CCE, each CCE including 9 REGs.

To determine whether a PDCCH including L CCEs is transmitted to a UE, the UE is configured to monitor $M^{(L)}(\geq L)$ CCEs that are arranged contiguously or in a predetermined rule. L that the UE should consider for PDCCH reception may be a plural value. CCE sets that the UE should monitor to receive a PDCCH are referred to as a search space. For example, the LTE system defines search spaces as illustrated in [Table 1].

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In [Table 1], L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only to a specific UE and a common search space accessible to all UEs within a cell. A UE monitors common search spaces with CCE aggregation levels 4 and 8 and UE-specific search spaces with CCE aggregation levels 1, 2, 4, and 8. A common search space and a UE-specific search space may overlap with each other.

For each CCE aggregation level, the position of the first CCE (a CCE having the smallest index) of a PDCCH search space allocated to a UE changes in every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency area of the control region of a subframe. As a control channel is configured in units of a CCE but interleaved in units of an REG, a frequency diversity gain and an interference randomization gain may be maximized.

Due to emergence and proliferation of various devices requiring Machine-to-Machine (M2M) communication and a large amount of data, the amount of required data over a cellular network is increasing very fast in a current wireless communication environment. To satisfy the high data amount requirement, communication technology is being developed to Carrier Aggregation (CA) that enables efficient use of more frequency bands, MIMO that increases a data capacity in a limited frequency, Coordinated Multi-Point (CoMP), etc. Furthermore, the communication environment is evolving toward highly populated nodes accessible to users. A system having highly populated nodes may increase system performance through cooperation between nodes. This technology has very excellent performance, relative to a non-cooperative case where each node serves as an independent Base Station (BS), Advanced BS (ABS), Node B, eNB, Access Point (AP), or the like.

Figure 9:
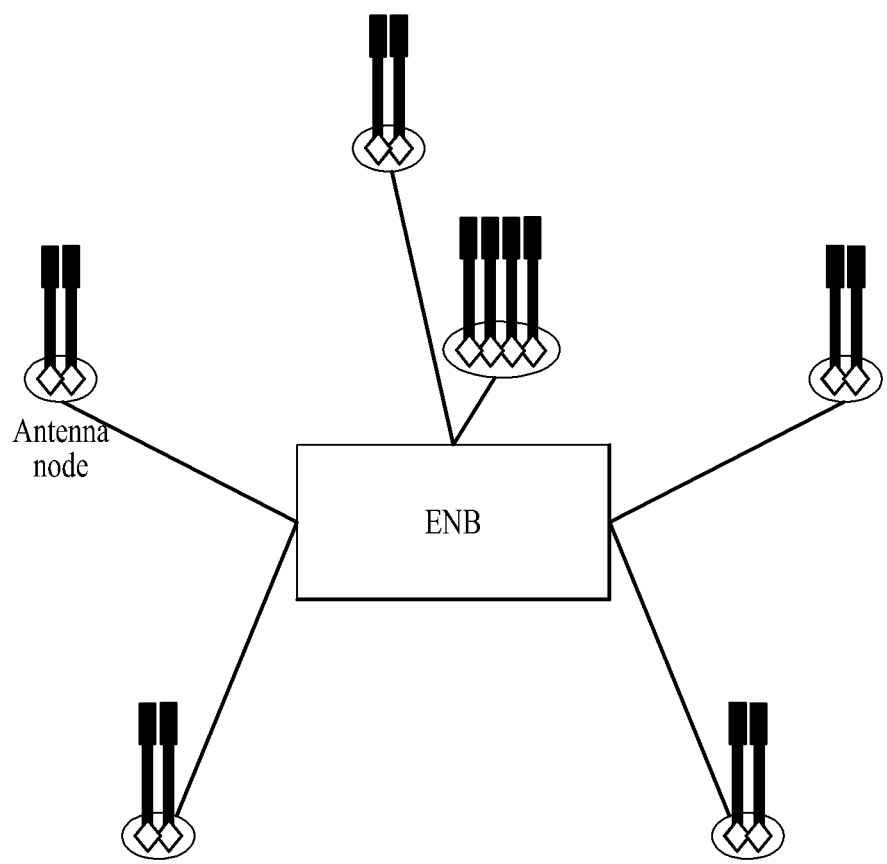
FIG. 9 illustrates a multi-node system as a future-generation communication system.

FIG. 9 illustrates a configuration of a multi-node system as a future-generation communication system.

Referring to FIG. 9, if all nodes collectively operate as an antenna set of a cell, with their transmission and reception under control of a controller, this system may be regarded as a Distributed Multi-Node System (DMNS) forming one cell. The individual nodes may be allocated node IDs or may operate as antennas of the cell without node IDs. However, if the nodes have different cell IDs, this system may be regarded as a multi-cellular system. If multiple cells are overlaid according to their coverage, this is called a multi-tier network.

Meanwhile, a node may be any of a Node B, an eNB, a Picocell eNB (PeNB), a Home eNB (HeNB), a Remote Radio Head (RRH), a relay, a distributed antenna, etc. At least one antenna is installed in one node. A node is also called a transmission point. While a node refers to an antenna group with antennas apart from each other by a predetermined distance or farther, the present invention may be implemented even though a node is defined as an antenna group irrespective of the distance between antennas.

Owing to the introduction of the afore-described multi-node system and relay nodes, various communication techniques have become available, thereby improving channel quality. However, to apply MIMO and inter-cell cooperative communication technology to a multi-node environment, a new control channel is required. In this context, Enhanced PDCCH (E-PDCCH) is under discussion and it is regulated that the E-PDCCH is allocated to a data region (hereinafter, referred to as a PDSCH region) other than a legacy control region (hereinafter, referred to as a PDCCH region). Since the E-PDCCH enables transmission of control information about a node to each UE, shortage of the legacy PDCCH region may be overcome. The E-PDCCH may be accessible only to LTE-A UEs, not to legacy UEs.

As described above, if the PDCCH of the legacy LTE system (LTE Release 8/9/10) has degraded performance, the E-PDCCH may be used as an excellent alternative to the legacy PDCCH in an environment where inter-cell interference exists.

Figure 10:
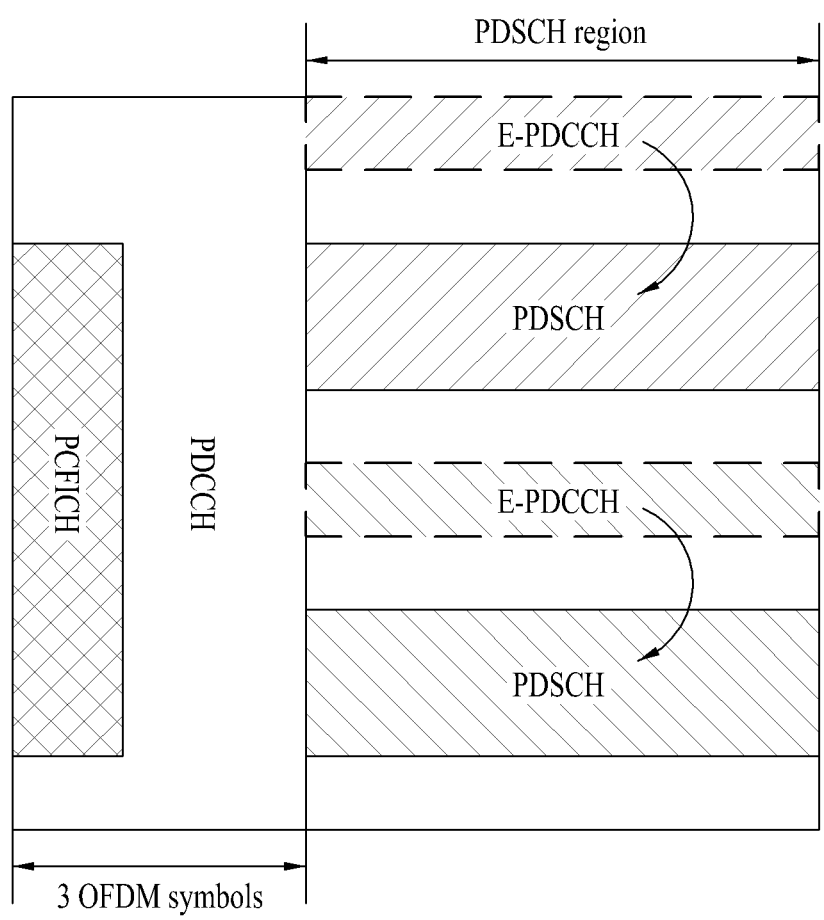
FIG. 10 illustrates an example of an Enhanced Physical Downlink Control Channel (E-PDCCH) and a Physical Downlink Shared Channel (PDSCH) scheduled by the E-PDCCH.

FIG. 10 illustrates an example of an E-PDCCH and a PDSCH scheduled by the E-PDCCH.

Referring to FIG. 10, an E-PDCCH may occupy a part of a PDSCH region that typically carries data. A UE should perform blind decoding to determine the presence or absence of an E-PDCCH directed to the UE. The E-PDCCH functions to schedule (i.e. PDSCH and PUSCH control) like a legacy PDCCH. However, if more UEs are connected to nodes such as RRHs and thus more E-PDCCHs are allocated to the PDSCH region, the UE should perform more blind decodings, thus experiencing increased complexity. FIG. 10 is a purely exemplary embodiment of E-PDCCH allocation. An E-PDCCH and a PDSCH detected based on the E-PDCCH may be configured in another manner using different frequency and time resources from illustrated in FIG. 10.

Figure 11:
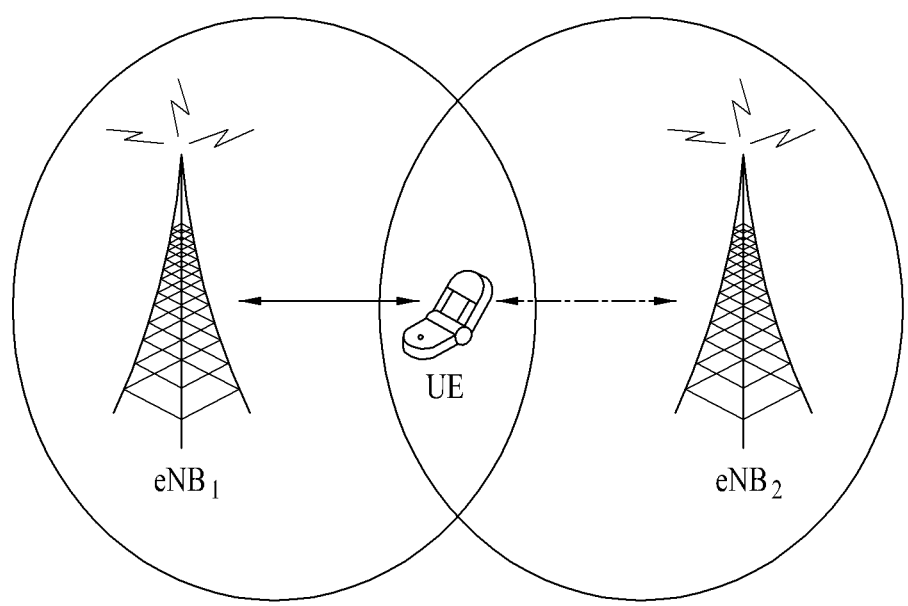
FIG. 11 illustrates interference in a multi-cellular system.

FIG. 11 illustrates an example in which a second eNB, eNB2 interferes with DL communication between a first eNB, eNB1 and a UE. Particularly, it is assumed that the first and second eNBs, eNB1 and eNB2 conduct DL communication on a co-channel.

The present invention provides a method for performing a random access procedure at a UE, with minimized inter-cell interference.

While the following description is given in the context of a contention-based random access procedure, it is to be understood that the present invention can be extended to a contention-free random access procedure.

Before transmitting a Random Access (RA) message to a specific cell, a UE may determine an RA configuration such as PRACH-ConfigurationIndex or the position of frequency resources (e.g., PRACH-FrequencyOffset) for use in transmitting the RA message by decoding a System Information Block (SIB) (e.g., SIB-2 information). For example, the UE may acquire, from the RA configuration (e.g., PRACH-ConfigurationIndex), information about an RA preamble format, the type (e.g., even, any, or N/A) of a System Frame Number (SFN) of a frame carrying the RA message, and a subframe number of a subframe carrying the RA message in the frame. In another example, the UE may determine the frequency-domain position at which the RA message is to be transmitted, from PRACH-FrequencyOffset.

The UE transmits the RA message to a specific eNB based on the received information and receives a Random Access Response (RAR) message from the eNB in response to the RA message. In the legacy LTE system (e.g., Release 8/9/10), for example, the UE blind-decodes a PDCCH Common Search Space (CSS) based on (or using) a Random Access-Radio Network Temporary Indicator (RA-RNTI) and receives an RAR message indicated by information of a PDCCH detected by the blind decoding.

However, since a DL control channel region of a specific cell may experience severe interference from a neighbor cell in an inter-cell interference environment, it may be more effective to use an E-PDCCH search space (e.g., an E-PDCCH CSS or an E-PDCCH UE-specific Search Space (USS)) than to use a legacy DL control channel CSS (or USS).

Accordingly, the present invention provides a method for enabling a UE to perform a random access procedure using a control channel having mitigated interference or to receive an RAR message from an eNB effectively (or with relatively mitigated interference) by configuring the UE to receive the RAR message using a plurality of search spaces (e.g., a CSS or a USS) (efficiently) which are separated in terms of radio resources, when the UE performs the random access procedure in the inter-cell interference environment.

Further, the separate search spaces may exist in the same CC (or cell) or different CCs (or cells) simultaneously in a CA system. In addition, each search space (e.g., a CSS or a USS) may be configured in a predetermined resource region or channel region (e.g., a control channel region such as an E-PDCCH region, or a data channel region) other than a legacy PDCCH or a legacy PDSCH.

The separate search spaces may exist simultaneously in the same (predetermined) E-PDCCH set or (predetermined) different E-PDCCH sets.

Figure 12:
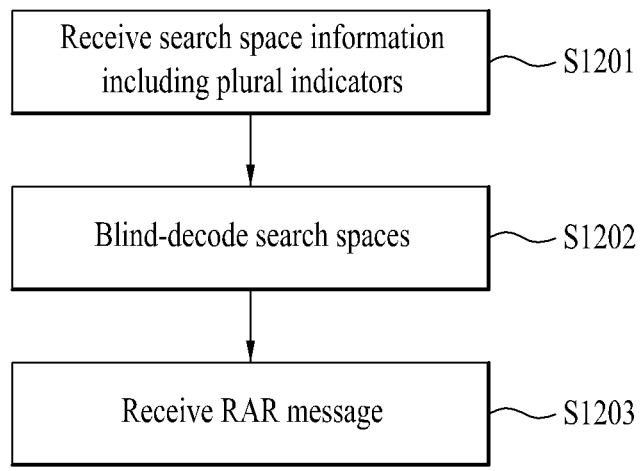
FIG. 12 is a flowchart illustrating a random access procedure using a search space based on a plurality of indicators according to an embodiment of the present invention.

FIG. 12 illustrates a random access procedure according to an embodiment of the present invention.

Referring to FIG. 12, an eNB may transmit, to a UE, information indicating support of a DL control channel (e.g., an E-PDCCH) other than a legacy PDCCH in a communication system to which the UE belongs by an SIB or higher-layer signaling such as RRC signaling (e.g., a signaling type used in the case of non-initial access of a UE and in the case of acquired UL timing synchronization) (S1201).

Upon receipt of the information indicating support of another DL control channel, the UE blind-decodes at least one of a PDCCH search space (e.g., a PDCCH CSS) and a search space of another DL control channel (e.g., an E-PDCCH CSS or an E-PDCCH USS) (S1202). If the UE detects control information for an RAR message by the blind decoding, the UE receives an RAR message based on the detected control information (S1203). By this operation, the UE may also perform the random access procedure or receive the RAR message, with mitigated interference.

If the present invention is implemented in a CA system, the UE may perform a random access procedure or receive an RAR message, with mitigated interference by blind-decoding a PDCCH search space or E-PDCCH search space allocated (or configured) in a specific CC or by blind-decoding a PDCCH search space (e.g., a PDCCH CSS) in a specific CC, CC #1 and an E-PDCCH search space (e.g., an E-PDCCH USS) in another CC, CC #2.

For the convenience of description, it is assumed that a UE receives an RAR message from an eNB using two search spaces (e.g., a CSS or a USS) separated in terms of radio resources, SS # A and SS # B. The search spaces (i.e., SS # A and SS # B) defined in the present invention may exist in a legacy PDCCH region or the region of a DL control channel (e.g., an E-PDCCH) other than the legacy PDCCH. The search spaces include a CSS or a USS.

In the CA system, it is assumed that the search spaces may exist in the same CC or different CCs. Further, methods proposed by the present invention can be extended to a general case where a UE performs a random access procedure or receives an RAR message using a plurality of predetermined separate search spaces (e.g., a CSS or a USS).

Embodiment 1

In an embodiment of the present invention, an eNB may configure a specific frequency area for transmission of an RA message from a UE and the UE may receive an RAR message from the eNB using the specific frequency area, specifically a search space corresponding to (or linked to) the specific frequency area.

Figure 13:
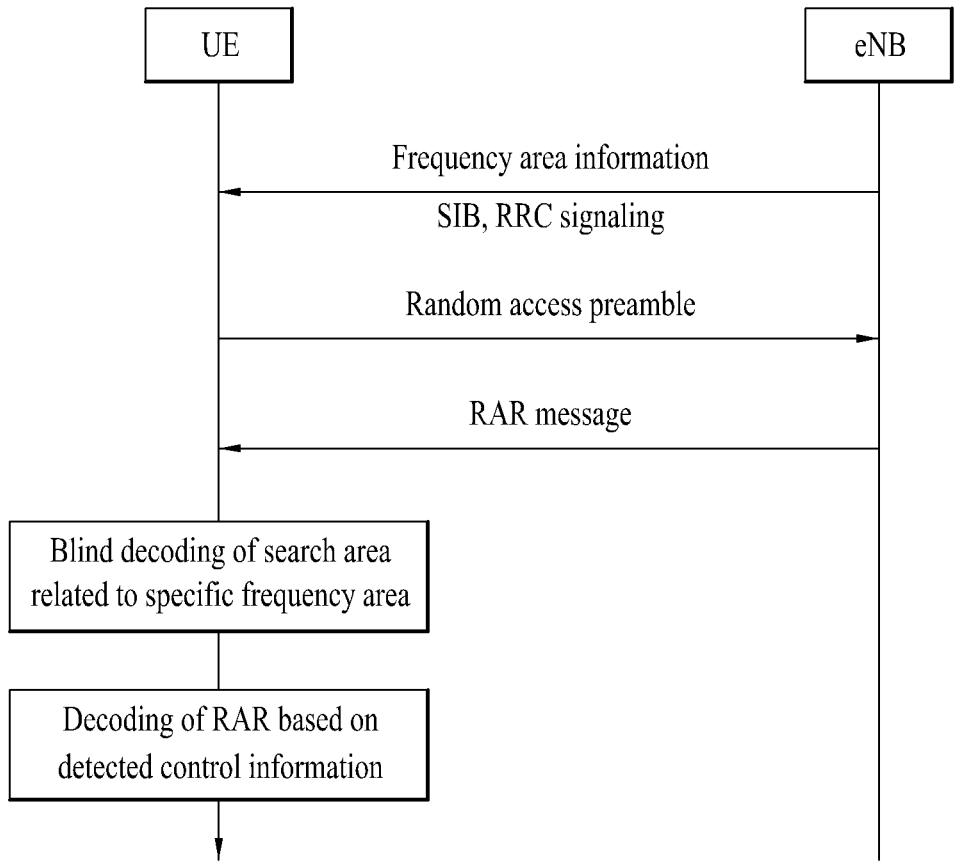
FIG. 13 illustrates a random access procedure using a search space related to a specific frequency area based on a plurality of indicators according to an embodiment of the present invention.

Referring to FIG. 13, an eNB may divide a frequency area configured for transmission of an RA message into a plurality of groups and transmit information about a search space corresponding to (or linked to) each of the groups (or information about the frequency groups) to a UE by predetermined signaling such as higher-layer signaling or physical-layer signaling (S1301).

That is, the eNB may classify a search space used for each frequency group as SS # A or SS # B and provide related information to the UE by predetermined signaling (e.g., higher-layer signaling or physical-layer signaling).

Or it may be regulated that the UE is supposed to perform a random access procedure or receive an RAR message based on SS # A and SS # B in a specific frequency area configured for transmission of an RA message and the eNB may transmit related information to the UE.

For example, the eNB may transmit the operation-related information (e.g., the information about the divided frequency groups or the information about the search spaces (e.g., a CSS or a USS) corresponding to or linked to the frequency groups) to the UE on a predetermined system information transmission channel (e.g., an SIB or a PBCH) or by RRC signaling (e.g., a signaling type applied to a case where a UE performs non-initial access or has acquired UL timing synchronization).

In the embodiment of the present invention, it is assumed that the eNB transmits to the UE a legacy SIB including information indicating a transmission position of an RA message in a frequency area (e.g., PRACH-FrequencyOffset). In this case, upon receipt of the operation-related information (e.g., the information about the divided frequency groups or the information about the search spaces (e.g., a CSS or a USS) corresponding to (or linked to) the frequency groups), the UE may identify a frequency group corresponding to the frequency-domain transmission position of the RA message by decoding the legacy SIB. In addition, the UE may acquire information about a search space (e.g., a CSS or a USS) corresponding to or linked to the frequency group based on the operation-related information and may efficiently perform a random access procedure or receive an RAR message based on the search space.

For example, the UE receives the RAR message based on SS # A or SS # B corresponding to or linked to the frequency group configured for transmission of the RA message.

Preferably, the eNB may transmit an indicator (e.g., a 1-bit indicator) related to application of the proposed method to the UE in advance on a predetermined system information transmission channel (e.g., an SIB or a PBCG) or by RRC signaling (e.g., a signaling type applied to a case where a UE performs non-initial access or has acquired UL timing synchronization).

Embodiment 2

In another embodiment of the present invention, an eNB may divide time resources into predetermined time units and transmit information about a time unit in which a UE will receive an RAR message (or information indicating whether an RAR message is transmitted based on a specific search space, a CSS or a USS in a specific time unit) to the UE by an indicator in a predetermined signal (e.g., a higher-layer signal or a physical-layer signal).

Figure 14:
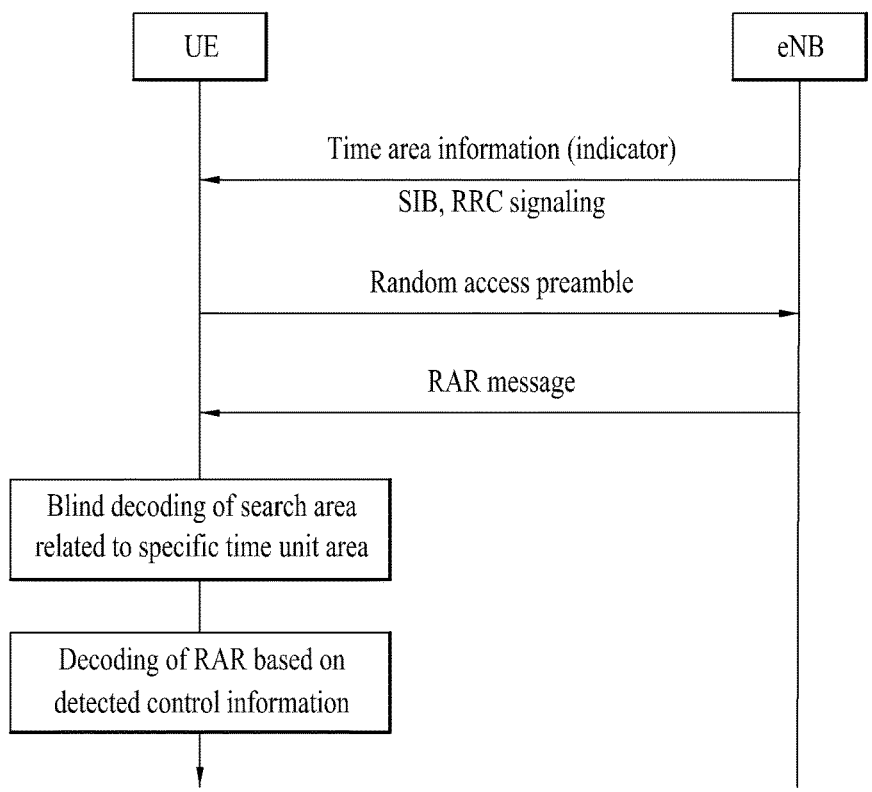
FIG. 14 illustrates a random access procedure using a search space related to a specific time area based on a plurality of indicators according to an embodiment of the present invention.

Referring to FIG. 14, an eNB may divide time resources into radio frames, subframes, or time units being groups of radio frames and subframes and may transmit to a UE information indicating whether an RAR message to be received in a specific time unit or at a specific time point is transmitted based on a specific search space, that is, a specific CSS or a specific USS. For example, the eNB may transmit information about a search space corresponding to (or linked to) the specific time unit or the specific time point to the UE by a bitmap-type indicator.

Therefore, the eNB may transmit, to the UE, operation-related information (e.g., information about predetermined time units into which time resources are divided or information about a speech space corresponding to (linked to) a specific time unit or a specific time point) on a predetermined system information transmission channel (e.g., an SIB or a PBCH) or by RRC signaling (e.g., a signaling type applied to a case where a UE performs non-initial access or has acquired UL timing synchronization). For example, if the indicator is configured as a bitmap of a predetermined length (or time period), each bit of the bitmap indicates a search space based on which an RAR message is received in a specific time unit or at a specific time point.

In the second embodiment of the present invention, it is assumed that time resources are divided into radio frames. In the case where the above-described proposed method is implemented in this situation, if a bit of the bitmap corresponding to a specific radio frame is set to "0", this may mean that an RAR message is received based on SS # A. If the bit is set to "1", this may mean that an RAR message is received based on SS # B.

In another method of the second embodiment of the present invention, the indicator may be represented as an index indicating a specific time unit divided from a time area.

For example, the eNB may divide time resources into radio frames, subframes, or (predetermined) time units being groups of radio frames and subframes and may notify the UE of a rule that indicates a search space (e.g., a CSS or a USS) based on which an RAR message is received in a corresponding time area according to an index (or number) of a specific predetermined time unit resulting from dividing a time area. Herein, the eNB may transmit to the UE the operation-related information (e.g., information about predetermined specific units into which time resources are divided, configuration information about a search space corresponding to (or linked to) the index (or number) of a specific time unit, or a method for indexing (or numbering) specific time units into which a time area is divided) on a predetermined system information transmission channel (e.g., an SIB or a PBCH) or by RRC signaling (e.g., a signaling type applied to a case where a UE performs non-initial access or has acquired UL timing synchronization). In addition, the UE receives an RAR message in a corresponding time area based on a search space corresponding to (or linked to) the index (or number) of a specific time unit out of the predetermined time units into which the specific time area is divided.

For example, in the case where time resources are divided into radio frames, if the index of a radio frame is an even number, this may mean that the UE receives an RAR message based on SS # A and if the index of a radio frame is an odd number, this may mean that the UE receives an RAR message based on SS # B.

Preferably, the eNB may transmit an indicator (e.g. a 1-bit indicator) related to application of the proposed method to the UE in advance on a predetermined system information transmission channel (e.g., an SIB or a PBCH) or by RRC signaling (e.g., a signaling type applied to a case where a UE performs non-initial access or has acquired UL timing synchronization).

Embodiment 3

An eNB may indicate to a UE that the UE is supposed to receive an RAR message based on a specific search space using (linked to) information about a preamble format or preamble sequence index that the UE has used in transmitting an RA message.

Figure 15:
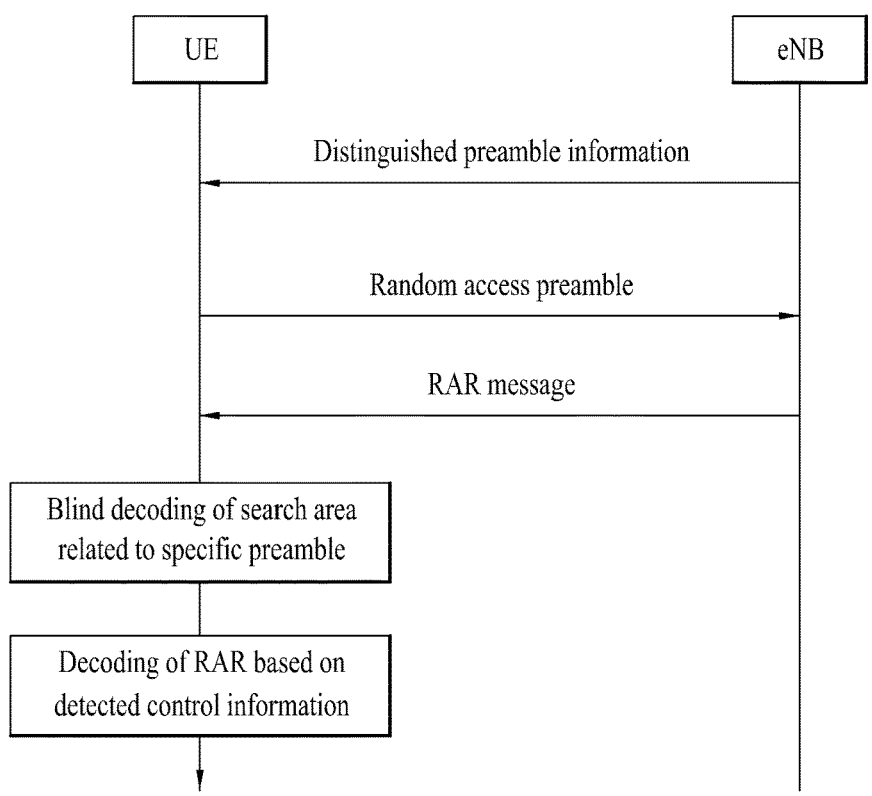
FIG. 15 illustrates a random access procedure using a search space related to a specific preamble based on a plurality of indicators according to an embodiment of the present invention.

Referring to FIG. 15, an eNB may divide preamble format information or preamble sequence index information into a plurality of groups and may transmit information about search spaces corresponding to (or linked to) the groups to a UE. The UE may determine a group type corresponding to a preamble format or preamble sequence index used in transmitting an RA message or a specific search space corresponding to (or linked to) the group based on the above operation-related information. Then the UE blind-decodes the specific search space (e.g., SS # A or SS # B) corresponding to (or linked to) the group in order to detect control information for an RAR message. Upon detection of the control information for the RAR message by the blind decoding, the UE receives the RAR message based on the control information. The eNB may transmit to the UE the operation-related information (e.g., information indicating how preamble format information or preamble sequence index information is divided into a plurality of groups or information about search spaces corresponding to (or linked to) the groups) on a predetermined system information transmission channel (e.g., an SIB or a PBCH) or by RRC signaling (e.g., a signaling type applied to a case where a UE performs non-initial access or has acquired UL timing synchronization).

Or a specific preamble format or preamble sequence index used in transmitting an RA message may be configured so that the UE is supposed to perform a random access procedure or receive an RAR message based on the predetermined SS # A or SS # B only in the case of the specific preamble format or preamble sequence index. The eNB may transmit related information to the UE. For example, the eNB may transmit to the UE the operation-related information (e.g., information about the specific preamble format or preamble sequence index defined for a random access procedure or RAR message reception based on the predetermined SS # A or SS # B or information about a search space (e.g., a CSS or USS) corresponding to (or linked to) the specific preamble format or preamble sequence index) on a predetermined system information transmission channel (e.g., an SIB or a PBCH) or by RRC signaling (e.g., a signaling type applied to a case where a UE performs non-initial access or has acquired UL timing synchronization).

Preferably, the eNB may transmit an indicator (e.g. a 1-bit indicator) related to application of the proposed method to the UE in advance on a predetermined system information transmission channel (e.g., an SIB or a PBCH) or by RRC signaling (e.g., a signaling type applied to a case where a UE performs non-initial access or has acquired UL timing synchronization).

Embodiment 4

In a fourth embodiment of the present invention, it may be regulated that an eNB transmits RA configuration information corresponding to (or linked to) each of divided search spaces (a CSS or USS) to a UE and the UE performs a random access procedure based on RA configuration information corresponding to (or linked to) a specific search space (having a relatively small amount of interference), taking into account the amounts of interference (caused by a neighbor cell) in the search spaces and receives an RAR message based on the corresponding search space. For example, the UE may measure the amounts of interference in the divided search spaces using predetermined RSs (e.g., CSI-RSs, CRSs, or DM-RSs) and may transmit the measurement information to the eNB by a predetermined UL signal (for example, the measurement information may be interpreted as indicating UE-selected random access information to the eNB). Further, the eNB may transmit the operation-related information (e.g., configuration information about the divided search spaces or information about RSs used to measure the amounts of interference in the search spaces) to the UE on a predetermined system information transmission channel (e.g., an SIB or a PBCH) or by RRC signaling (e.g., a signaling type applied to a case where a UE performs non-initial access or has acquired UL timing synchronization).

Figure 16:
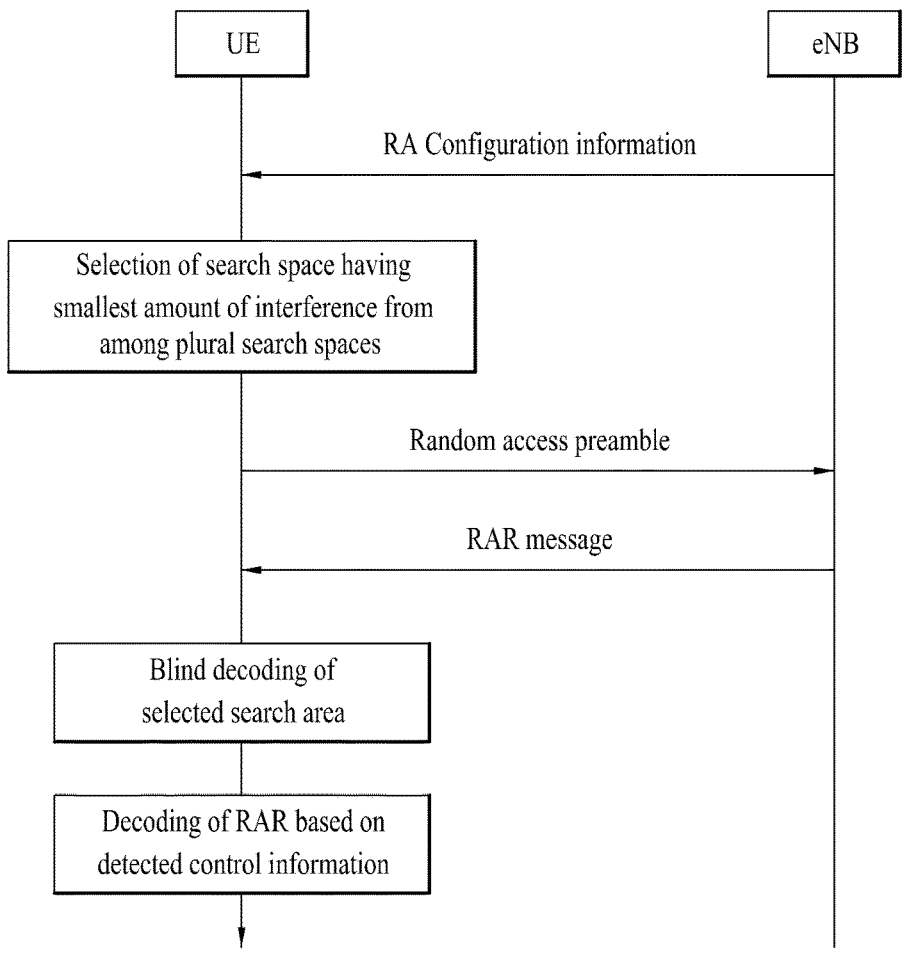
FIG. 16 illustrates a random access procedure using search spaces based on a plurality of indicators, in which a UE takes into account interference according to an embodiment of the present invention.

Referring to FIG. 16, an eNB may provide RA configuration information linked to search spaces SS # A and SS # B to a UE. Further, the eNB may determine specific RA configuration information (e.g. PRACH-ConfigurationIndex, PRACH-FrequencyOffset, a preamble sequence index, a preamble format, etc.) that the UE has selected based on the amounts of interference in the search spaces, from an RA message (configuration information) received from the UE. Accordingly, the UE may transmit an RAR message to the eNB based on a search space corresponding to (or linked to) the UE-selected RA configuration information.

For example, if the UE receives RA configuration information corresponding to (or linked to) the search spaces SS # A and SS # B from the eNB and the UE detects less neighbor-cell interference in SS # A than in SS # B, the UE may perform a random access procedure based on the RA configuration information linked to SS # A or receive an RAR message based on SS # A (linked to UE-selected RA configuration information).

Preferably, the eNB may transmit an indicator (e.g. a 1-bit indicator) related to application of the proposed method to the UE in advance on a predetermined system information transmission channel (e.g., an SIB or a PBCH) or by RRC signaling (e.g., a signaling type applied to a case where a UE performs non-initial access or has acquired UL timing synchronization).

Embodiment 5

In a fifth embodiment of the present invention, it may be regulated that an eNB transmits an RAR message based on a specific search space (having a relatively small amount of interference), taking into account the amounts of interference (caused by a neighbor cell) in divided search spaces. For example, the eNB may measure the amounts of interference in the divided search spaces using predetermined RSs (e.g., CSI-RSs, CRSs, or DM-RSs) and information about RSs used for interference measurement may be exchanged or shared between eNBs by a predetermined signal (e.g., via an X2 interface).

Figure 17:
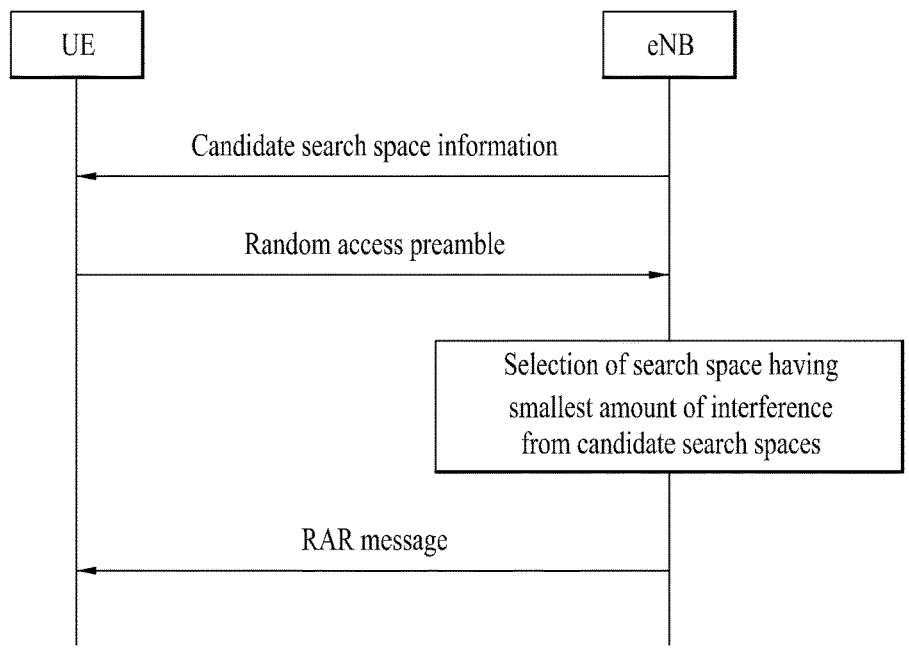
FIG. 17 illustrates a random access procedure using search spaces based on a plurality of indicators, in which an evolved Node B (eNB) takes into account interference according to an embodiment of the present invention.

Referring to FIG. 17, a UE does not know (immediately) a search space based on which an eNB transmits an RAR message (in response to an RA message transmitted previously by the UE). Therefore, the UE should blind-decode all of search spaces that can be set as search space candidates, (for detecting control information for an RAR message) using its RA-RNTI (or a preset RA-RNTI (e.g., the eNB may transmit RA-RNTI information to the UE on a predetermined system information transmission channel (e.g., an SIB or a PBCH) or by RRC signaling (e.g., a signaling type applied to a case where a UE performs non-initial access or has acquired UL timing synchronization)). Herein, the eNB may transmit operation-related information (e.g., configuration information about the divided search spaces, etc.) to the UE on a predetermined system information transmission channel (e.g., an SIB or a PBCH) or by RRC signaling (e.g., a signaling type applied to a case where a UE performs non-initial access or has acquired UL timing synchronization)).

In the LTE system, a legacy UE has only to blind-decode only the search space SS # A (e.g., a CSS or a USS) to receive an RAR message. If the UE fails to detect control information for the RAR message in the search space SS # A, the UE may not be allowed to perform blind decodings more than a (an existing) maximum number of blind decodings in the search spaces even though the UE performs blind decoding in an additional search space SS # B in the proposed method of the present invention. In another embodiment, the number of blind decodings may be set for each aggregation level in the search space candidates. For example, it may be regulated that the total number of blind decoding attempts for the search space candidates does not exceed a preset maximum number of blind decoding attempts from the view point of one UE. The eNB may transmit information related to this operation (e.g., information about the number of blind decodings for each aggregation level in the search space candidates or information about a maximum number of blind decoding attempts) to the UE on a predetermined system information transmission channel (e.g., an SIB or a PBCH) or by RRC signaling (e.g., a signaling type applied to a case where a UE performs non-initial access or has acquired UL timing synchronization).

For example, the UE receives information about the divided search spaces from the eNB and the eNB transmits an RAR message based on a specific search space having a relatively small amount of interference from among the search space candidates according to the proposed method. Therefore, the UE may receive the RAR message by performing blind decoding in the search space candidates according to a predetermined rule, for example, a rule of performing blind decoding sequentially in the search space candidates based on preset priority levels of the search space candidates. Preferably, the eNB may transmit an indicator (e.g. a 1-bit indicator) related to application of the proposed method to the UE in advance on a predetermined system information transmission channel (e.g., an SIB or a PBCH) or by RRC signaling (e.g., a signaling type applied to a case where a UE performs non-initial access or has acquired UL timing synchronization).

Embodiment 6

In a sixth embodiment of the present invention, it may be regulated that if a UE receives an RAR message in response to an RA message transmitted by the UE, based on a specific search space (e.g., a CSS or a USS), the UE transmits and receives random access procedure-related messages based on the specific search space during a random access procedure. For example, if the contention-based random access procedure illustrated in FIG. 4 is performed, the UE may receive a contention resolution message (step 4) based on a specific search space based on which the UE receives an RAR message (step 2). If the contention-free random access procedure illustrated in FIG. 5 is performed, the UE may receive an RA message (step 2) based on a specific search space in which allocated (dedicated) RA preamble information is received (step 0). The eNB may transmit information related to this operation (e.g., information about divided search spaces, etc.) to the UE on a predetermined system information transmission channel (e.g., an SIB or a PBCH) or by RRC signaling (e.g., a signaling type applied to a case where a UE performs non-initial access or has acquired UL timing synchronization).

Figure 18:
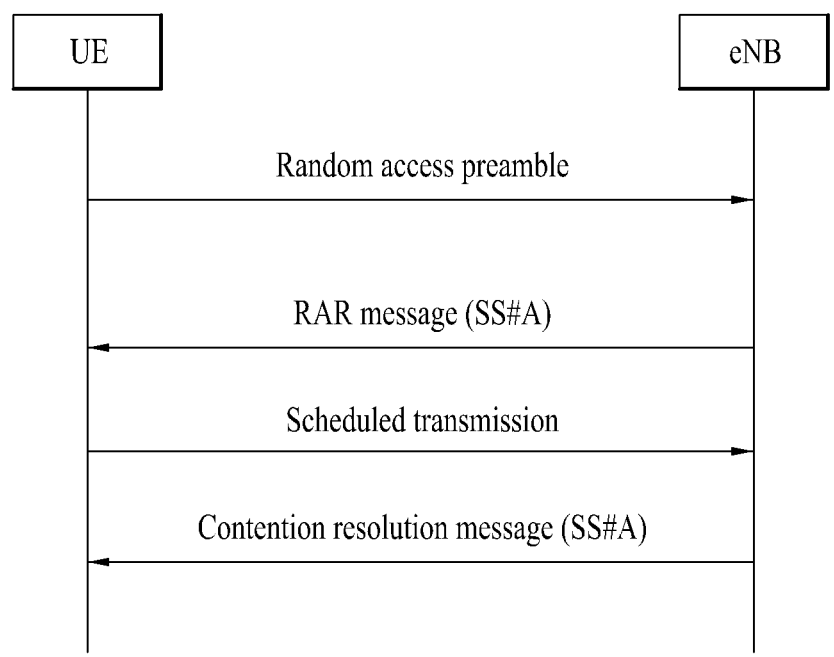
FIG. 18 illustrates a random access procedure of a UE using a specific search space related to a received message according to an embodiment of the present invention.

For example, referring to FIG. 18, if the UE receives an RAR message based on a specific search space from the eNB, the UE may receive a contention resolution message based on the specific search space used in receiving the RAR message.

Or the UE may transmit or receive an additional random access procedure-related message subsequently using a search space other than the specific search space used in receiving the RAR message. For example, the eNB may transmit information about a search space for use in transmission and reception of the additional random access procedure-related message to the UE on a predetermined system information transmission channel (e.g., an SIB or a PBCH) or by RRC signaling (e.g., a signaling type applied to a case where a UE performs non-initial access or has acquired UL timing synchronization).

For example, in the contention-free random access procedure, the UE may receive an RAR message based on a search space other than a specific search space used in receiving RA preamble information allocated according to a predetermined rule. In another example, if the contention-free random access procedure is performed, the UE may receive a contention resolution message based on a search space other than a specific search space used in receiving an RAR message according to a predetermined rule.

Preferably, the eNB may transmit an indicator (e.g. a 1-bit indicator) related to application of the proposed method to the UE in advance on a predetermined system information transmission channel (e.g., an SIB or a PBCH) or by RRC signaling (e.g., a signaling type applied to a case where a UE performs non-initial access or has acquired UL timing synchronization).

In the present invention, an additional method may be provided by combining the above-described embodiments. For example, radio resources (e.g., time and/or frequency resources) for transmission of an RA message and radio resources (e.g., time and/or frequency resources) for transmission of an RAR message may be defined separately according to a preset rule and an eNB may indicate a search space (e.g., a CSS or a USS) linked to each of the resource areas to a UE by an indicator (e.g., a bitmap) in a (predetermined) higher-layer signal or lower-layer signal. The eNB may transmit information related to an operation of the proposed method (e.g., information about the radio resources (e.g., time and/or frequency resources) for transmission of an RA message and the radio resources (e.g., time and/or frequency resources) for transmission of an RAR message or information about linkage between the resources and search spaces (e.g., a CSS or a USS) to the UE on a predetermined system information transmission channel (e.g., an SIB or a PBCH) or by RRC signaling (e.g., a signaling type applied to a case where a UE performs non-initial access or has acquired UL timing synchronization). Preferably, the eNB may transmit an indicator (e.g. a 1-bit indicator) related to application of the proposed method to the UE in advance on a predetermined system information transmission channel (e.g., an SIB or a PBCH) or by RRC signaling (e.g., a signaling type applied to a case where a UE performs non-initial access or has acquired UL timing synchronization).

The afore-described embodiments of the present invention can be extended to a case where search spaces exist in a specific control information transmission channel region (e.g., an E-PDCCH region) defined in a preset resource area as well as a case where the search spaces exist in a legacy control information transmission channel region (e.g., a PDCCH region). In addition, the embodiments of the present invention can be extended to a case where transmission of an RA message is triggered by a control information transmission channel (e.g., a PDCCH) in a general UL synchronization situation as well as a case where a random access procedure is performed for initial access. Also, it may be regulated that the embodiments of the present invention are applied to a whole random access procedure or a (predetermined) step of the random access procedure (e.g., the second and fifth embodiments of the present invention may be performed in step 4 independently of step 2 in the contention-based random access procedure or in step 3 independently of step 1 in the contention-free random access procedure) (see FIG. 4).

Further, the afore-described embodiments of the present invention can be extended to any environment where neighbor-cell interference exists and may be applied to a case where interference exists (e.g., when a specific cell and a neighbor cell use CCs (or extension carriers) of the same band at the same time or interference exists between CCs (or extension carriers) of an intra-band used by different cells) in a CA environment. In addition, the above-described embodiments can be extended to an environment where interference occurs between different cells by dynamically changing the usage of radio resources according to a system load state by an eNB.

The above proposed methods may be extended even to a communication situation 'between an eNB and a Relay Node (RN)', 'between an RN and a UE', or 'between a UE and another UE (D2D)' as well as a communication situation between an eNB and a UE. The proposed methods may also be extended to a case where control information is transmitted in a legacy PDSCH region (as well as if control information is transmitted in a legacy PDCCH region), that is, an environment where E-PDCCH-based communication (e.g., an E-PDCCH-based random access procedure or an E-PDCCH-based system information (e.g., an E-SIB or an E-PBCH) reception operation) is performed. Herein, even though a plurality of E-PDCCH sets are configured, the proposed methods can be applied. Further, the proposed methods can be extended to a case where interference exists in specific RSs (e.g., CRSs, CSI-RSs, or DM-RSs) of cells participating in cooperative communication or a case where interference is caused by neighbor cells (to a set of cells participating in cooperative communication) other than the set of cells participating in cooperative communication, in an environment where cells conduct cooperative communication.

Figure 19:
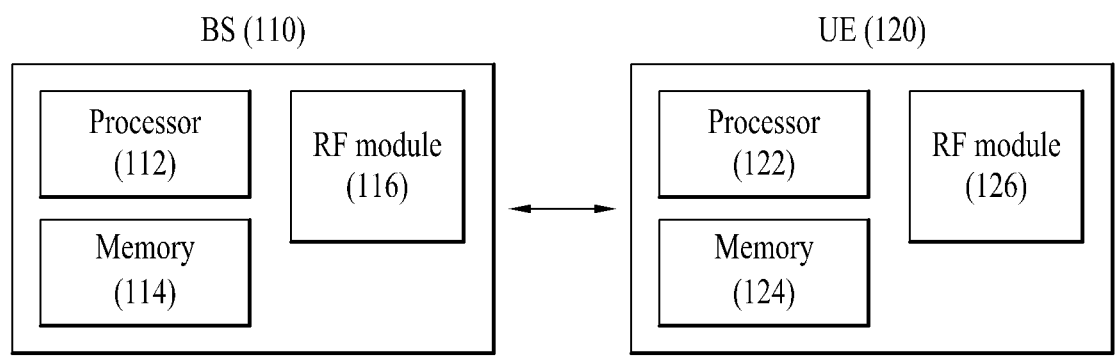
FIG. 19 is a block diagram of an eNB and a UE that may be applied to embodiments of the present invention.

FIG. 19 illustrates an eNB and a UE that are applicable to an embodiment of the present invention. If a wireless communication system includes a relay, backhaul link communication takes place between an eNB and a relay and access link communication takes place between a relay and a UE. Accordingly, the eNB or the UE illustrated in FIG. 19 may be replaced with a relay under circumstances.

Referring to FIG. 19, the wireless communication system includes a BS 110 and a UE 120. The BS 110 includes a processor 112, a memory 114, and a Radio Frequency (RF) unit 116. The processor 112 may be configured so as to implement procedures and/or methods proposed by the present invention. The memory 114 is connected to the processor 112 and stores various types of information related to operations of the processor 112. The RF unit 116 is connected to the processor 112 and transmits and/or receives a radio signal. The UE 120 includes a processor 122, a memory 124, and an RF unit 126. The processor 122 may be configured so as to implement procedures and/or methods proposed by the present invention. The memory 124 is connected to the processor 122 and stores various types of information related to operations of the processor 122. The RF unit 126 is connected to the processor 122 and transmits and/or receives a radio signal. The BS 110 and/or the UE 120 may have one or more antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for performing a random access procedure at a UE in a wireless communication have been described in the context of a 3GPP LTE system, by way of example, they are applicable to many other wireless communication systems.

The invention claimed is:

1. A method for performing a random access procedure by a User Equipment (UE) in a wireless access system, the method comprising:
   receiving, by the UE, configuration information on a Random Access (RA) message comprising a first RA message and a second RA message from an evolved Node B (eNB),
   wherein the configuration information informs on the RA message by using a bitmap,
   wherein based on a bit of the bitmap corresponding to a specific radio frame being set to "0", a Random Access Response (RAR) message is received based on the first RA message,
   wherein based on the bit of the bitmap corresponding to the specific radio frame being set to "1", the RAR message is received based on the second RA message,
   wherein the first RA message is configured for a common search space of a Physical Downlink Control CHannel (PDCCH) on a first carrier, and
   wherein the second RA message is configured for a UE-specific search space of a ePDCCH on a second carrier,
   transmitting, by the UE, the first RA message or the second RA message to the eNB based on the configuration information; and
   blind-decoding the common search space of the PDCCH on the first carrier for the RAR message when the first RA message is transmitted, or
   blind-decoding the UE-specific search space of the ePDCCH on the second carrier for the RAR message when the second RA message is transmitted,
   wherein the UE receives information on a search space for a Random Access Preamble assignment based on a contention-free random access procedure.

2. The method according to claim 1, wherein the configuration information on the RA message is informed by a system information transmission channel including a Physical Random Access Channel (PRACH) frequency offset.

3. The method according to claim 1, wherein the first RA message and the second RA message are distinguished by different preamble formats or different preamble sequence indexes.

4. The method according to claim 1, wherein the configuration information on the RA message is determined to have a smaller amount of interference between the common search space and the UE-specific search space.

5. The method according to claim 1, wherein the RAR message is transmitted from the eNB according to a downlink control channel transmitted in a search space having a smaller amount of interference between the common search space of the PDCCH and the UE-specific search space of the ePDCCH.

6. The method according to claim 1, further comprising receiving a message for the random access procedure based on a search space other than the search space for the RAR message.

7. The method according to claim 1, further comprising allocating an RA preamble,
   wherein the search space for the RAR message is different from a search space in which the RA preamble is received.

8. A User Equipment (UE) for performing a random access procedure in a wireless access system, the UE comprising:
   a transceiver; and
   a processor coupled to the transceiver,
   wherein the processor is configured to:
   control the transceiver to receive configuration information on a Random Access (RA) message comprising a first RA message and a second RA message from an evolved Node B (eNB),
   wherein the configuration information informs on the RA message by using a bitmap,
   wherein based on a bit of the bitmap corresponding to a specific radio frame being set to "0", a Random Access Response (RAR) message is received based on the first RA message,
   wherein based on the bit of the bitmap corresponding to the specific radio frame being set to "1", the RAR message is received based on the second RA message,
   wherein the first RA message is configured for a common search space of a Physical Downlink Control CHannel (PDCCH) on a first carrier, and
   wherein the second RA message is configured for a UE-specific search space of an ePDCCH on a second carrier,
   transmit the first RA message or the second RA message to the eNB based on the configuration information, and
   blind-decode the common search space of the PDCCH on the first carrier for the RAR message when the first RA message is transmitted, or
   blind-decode the UE-specific search space of the ePDCCH on the second carrier for the RAR message when the second RA message is transmitted,
   wherein the UE receives information on a search space for a Random Access Preamble assignment based on a contention-free random access procedure.

* * * * *